United States Patent [19]
Tisdale

[11] Patent Number: 5,214,797
[45] Date of Patent: Jun. 1, 1993

[54] METHOD AND APPARATUS FOR PROTECTION OF SKIN AGAINST MOSQUITOS AND OTHER INSECTS

[76] Inventor: Michael Tisdale, 25000 SW. 207th Ave., Homestead, Fla. 33031

[21] Appl. No.: 761,718

[22] Filed: Sep. 17, 1991

[51] Int. Cl.⁵ ............................................. A41D 13/00
[52] U.S. Cl. .................................................... 2/2; 2/4; 2/84; 2/DIG. 1
[58] Field of Search ................. 2/DIG. 1, 2, 69, 79, 2/4, 22, 84, 16, 94, 243 A; 36/2 R

[56] References Cited

U.S. PATENT DOCUMENTS

| | | | |
|---|---|---|---|
| 1,780,801 | 11/1930 | Shlenker | 2/4 |
| 2,367,006 | 1/1945 | Cope | 2/4 |
| 3,783,451 | 1/1974 | Malin | 2/DIG. 1 |
| 4,685,152 | 8/1987 | Heare | 2/79 |
| 4,716,594 | 1/1988 | Shannon | 2/DIG. 1 |
| 4,985,933 | 1/1991 | Lemoine | 2/DIG. 1 |

FOREIGN PATENT DOCUMENTS 489382  1/1919  France ............................................. 2/4

Primary Examiner—Clifford D. Crowder
Assistant Examiner—Amy B. Vanatta
Attorney, Agent, or Firm—Malin, Haley, DiMaggio & Crosby

[57] ABSTRACT

A light weight fabric designed to protect the wearer from mosquitos, biting flies, and other various insects by using a fine mesh with the open areas of the mesh sufficiently small so as to not allow the body of a mosquito or other insect to come within a distance which would permit their stingers, beaks, or mouths to contact wearer's skin. The mesh is elevated above the skin by use of a compressible resilient reticulated polyurethane foam stitched along the inner side of the mesh in separate parallel rows causing the mesh to arch out away from wearer's skin if the strips are moved in close proximity to each other.

11 Claims, 3 Drawing Sheets

METHOD AND APPARATUS FOR PROTECTION OF SKIN AGAINST MOSQUITOS AND OTHER INSECTS

BACKGROUND OF THE INVENTION

1. Field of the Invention

This invention generally relates to the use of a fabric in protecting humans, animals, fruits, vegetables and, in particular, to a modified fabric that can be formed into a light weight garment or the like to protect any object susceptible to insect bites and stings.

2. Description of the Prior Art

Many insects are known for their ability to inflict painful bites and stings. In addition to this annoying situation, of concern is that many insects can transmit parasites, viruses and other deadly diseases. The Mosquito alone is a known carrier of Yellow Fever, Dengue, Malaria and Elephantiasis. Conventional prevention of the insect bite is accomplished by destroying the insect or repelling the insect at the skin surface. Chemical repellents are commonly used to mask natural skin scent, however, many repellents are often objectional as the chemical typically has a foul odor and includes an oily base which can be irritating to the eyes and skin. Further, numerous chemicals are known carcinogens which are liberally applied by the unwary consumer or due to lack of substitute. Still another problem with chemical repellents is that they lose effectiveness through wear or dilution by moisture and must be constantly reapplied. Repellents are often unattainable in remote areas of poorer countries with limited access to non-durable consumer goods.

Applying chemicals to fruits and vegetables is objectionable by many consumers due to religious beliefs or fear of contaminating the food. Application of chemicals to protect household pets can irritate animals which possess a keener sense of smell than its applier.

Through the use of a reusable insect excluding fabric, consumers can protect themselves even in insect infested remote areas. A well known example being the use of an insect net hung over a bed. However, insect fabric may also be used to encompass the wearer in the form of a garment. U.S. Pat. No. 4,716,594 to Shannon discloses a multilayered garment for humans having an insect excluding fabric hung loosely over an inner fabric. The inner fabric is described as a coarse mesh blend of synthetic and cotton fibers connected at the seams to an outer layer of insect excluding mesh. Utilizing the thickness of the yarn and the free movement between the two layers to maintain space between wearer's skin surface and the outer layer of fabric. It is noted that this type of double layered garment with an inner mesh supporting an outer mesh would be bulky and heavy. In addition since such a garment will be primarily worn in warm environments, the inner fabric would be prone to saturation with moisture and perspiration making garment heavy and prone to mildew. Also inner fabric of yarn would tend to be rigid taking a compression set once compressed. Further, Shannon's use of an inner woven mesh as an inner garment inhibits the lateral flow of air across the skin surface with a high ratio non-permeable support material to surface area, making garment cumbersome to wearer.

U.S. Pat. No. 3,783,451 issued to Malin illustrates a design that is uneconomical to manufacture due to waste involved with die stamping plastic or other suitable spacing rings and time required to align the individual rings on the insect excluding fabric. Further, there is no known practical and permanent method of attaching rings to the fabric. Malin also omits a means for preventing the insect fabric from contacting the skin at areas where the insect fabric is not directly separated from skin by the spacing means. This is a particular problem for articulating areas such as elbows and knees where the fabric has a tendency to collect together allowing the biting insect to reach the skin.

SUMMARY OF THE INVENTION

I have endeavored to devise a practical and economical way to elevate an insect excluding fabric away from the wearer's skin that accommodates those areas were fabric was a tendency to collect. In addition, a means for spacing is provided that makes the spacer and fabric lightweight, breathable, and unrestricting in either the stretched or collected mode.

The primary object of the present invention is to provide a spacing means which overcomes the problems previously mentioned in the use of insect excluded fabric. This spacing means will elevate the insect excluding fabric above the wearer's skin at a sufficient distance to eliminate the possibility of an insects' beak or proboscis from reaching and/or penetrating wearer's skin. In addition, a free flow of air to pass through the garment and support material to prevent the wearer from becoming hot.

By utilizing compressible resilient polyurethane foam and a method of stitching the foam to a mesh, the construction is made permeable to air, moisture and sunlight. Use of compressible strips of foam allows one to wear the garment under normal clothes such as shorts or as a full size jumpsuit. The garment can be formed into a separate shirt and trousers with cuffs, waist and leg openings equipped with a resealable means to prevent passage of insects.

The invention is basically a netting fabric and novel foam spacer adaptable to skin shapes. The fabric employs a plurality of elongated, rectangularly-shaped, flexible strips of reticulated polyurethane foam strips disposed in a spatial parallel relation to each other by stitching to the insect excluding fabric. The stitching deforms a center portion of each strip whereby the fabric maintains a fixed distance from skin by use of the strips as a spacer and excess fabric is directed away from the skin when the fabric is bunched or collected together.

Therefore, an object of the instant invention is to provide an economical method of construction with minimal waste by employing a unitized fabric having a plurality of foam strips attached thereto to permit conventional pattern designs. Said fabric can be sheared off rather than die-stamped or specially woven as in the prior art.

It is yet another object of the instant invention to provide a design that places foam spatial strips in parallel format providing minimal skin surface contact and maximum lateral uninterrupted air travel for free air circulation.

Yet another object of the instant invention is the use of reticulated foam for the strips to prevent moisture saturation and further having a porosity for movement of air within the strips thereby allowing radiation of body heat away from the skin surface.

Still another objective is to use tension stitching of fabric to foam strips for maximum free span between support strips.

Yet another objective of the present invention is to make a garment with compressible spacing strips allowing for comfortable placement of a finished garment under conventional clothes. The garment can be supplied as a separate shirt and trousers with detachable hood or as a coverall type garment. Cuffs, waist and leg openings can be equipped with a resealable opening to prevent passage of said insects.

In accordance with these and other objects which will be apparent hereinafter, the present invention will now be described with particular reference to the accompanying drawings.

BRIEF DESCRIPTION OF THE DRAWINGS

The accompanying drawings illustrate the mannequin figure and image projection system of the disclosed invention. In such drawings.

DETAILED EMBODIMENT OF THE INVENTION

As required, a detailed embodiment of the present invention is disclosed herein. However, it is to be understood that the disclosed embodiment is merely exemplary of the invention which may be embodied in various forms. Therefore, specific functional and structural details disclosed herein are not to be interpreted as limiting, but merely as a basis for the claims and as a representative basis for teaching one skilled in the art to variously employ the present invention in virtually any appropriate structure.

Figure 1:
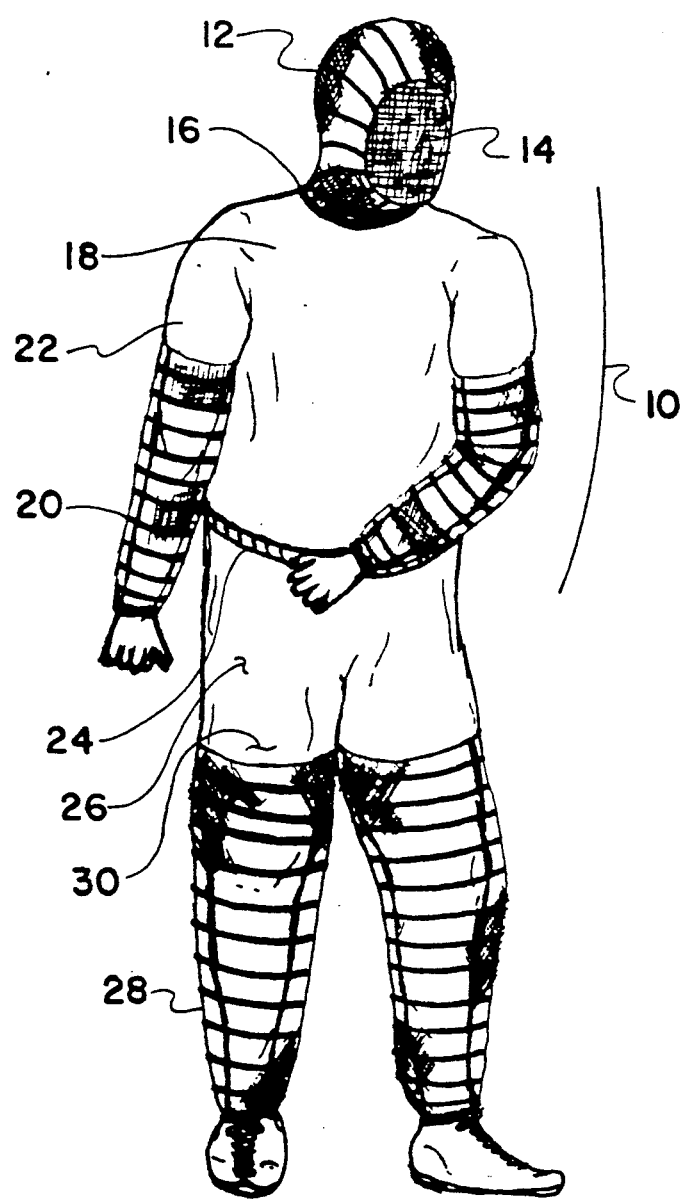
FIG. 1 is a prospective view of a person wearing the ribbed fabric beneath a garment.

Referring to FIG. 1, a typical usage of my invention is depicted wherein user 10 is shown with a hood 12 encompassing the users head. A detachable face shield 14 car be incorporated into the hood 12 as more fully described later in this specification. A single piece upper body portion 16 is shown as worn beneath a short sleeve shirt 18 wherein arm portions 20 of upper body portion 16 extend beyond the length of shirt sleeve 22. It should be noted that the upper body portion 16 can be made in sections and attached to a shirt in and of itself. Additionally, a single piece lower body portion 24 is shown as worn beneath shortened pants 26 wherein the leg portion 28 of lower body portion 24 extends beyond the length of shortened pant leg 30. As with the upper portion, the lower portion can be made in sections for direct attachment to shortened pants.

Figure 2:
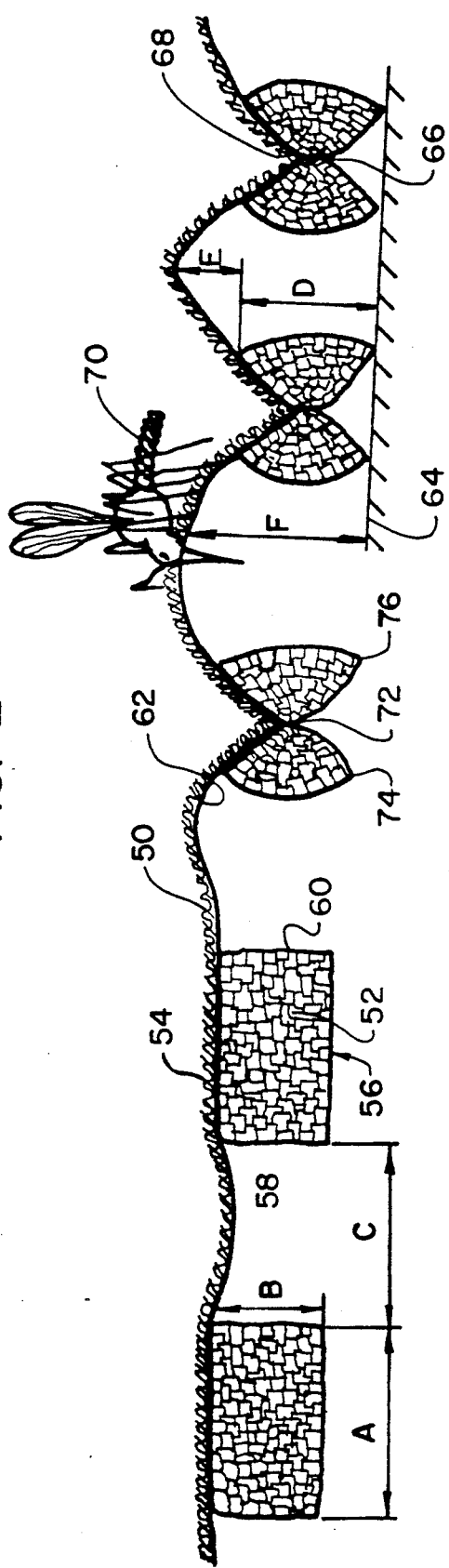
FIG. 2 is an enlarged detailed view of the fabric with strips attached thereto.

Now referring to FIG. 2 fabric 50 is an insect excluding mesh having an inner and an outer surface face. The mesh 50 can be a conventional nylon net sold as mosquito netting or more preferably a flame retardant polyester mesh which is soft, easily deformed, yet resilient and more durable than nylon when subjected to normal wear. A plurality of elongated, rectangularly shaped, flexible strips 52 of compressible resilient polyurethane foam having an upper surface 54, a bottom surface 56, a first side surface 58 and a second side surface 60. Strip 52 has a width A measured between side 58 and side 60 of approximately ⅛ inch to ¾ inch wide with a preferred width of ⅜ of an inch. An overall thickness B between upper surface 54 and lower surface 56 of approximately ⅛ inch to ½ inch thick with a preferred thickness of ¼ inch. Each strip is disposed in a spatial relation to each other in a parallel relationship having space C of approximately ½ inch to 1½ inch between strips with a preferred thickness of ¾ inch. Space C further illustrates how the mesh 50 will snag lessening the distance between the mesh and surface in a typical application presented by the prior art.

Strip 52, having a low compression set of ten to twenty percent, is attached to mesh 50 by stitching 66 to the inner surface face 62 of mesh 50 near the middle of strip 52 between sides 58 and 60. Switching creates a unitized textile with mesh 50 supported by the individual strips 52 relying on the resilience of strip 52 to maintain a fixed distance D between inner face surface 62 and skin surface 64. Use of foam strip 52 allows compression when the wearer is pressed against an object and resiliency upon moving away from said object as strip 52 expands to its original state.

Figure 3:
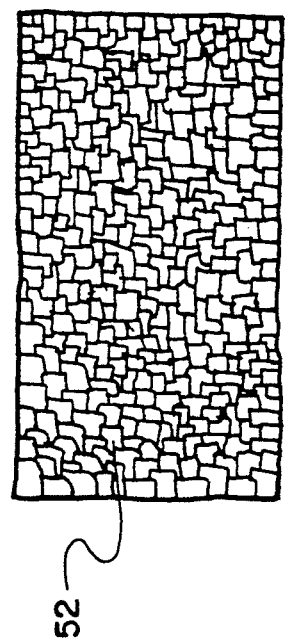
FIG. 3 is a cross sectional view showing the porosity of a reticulated foam strip.
Figure 4:
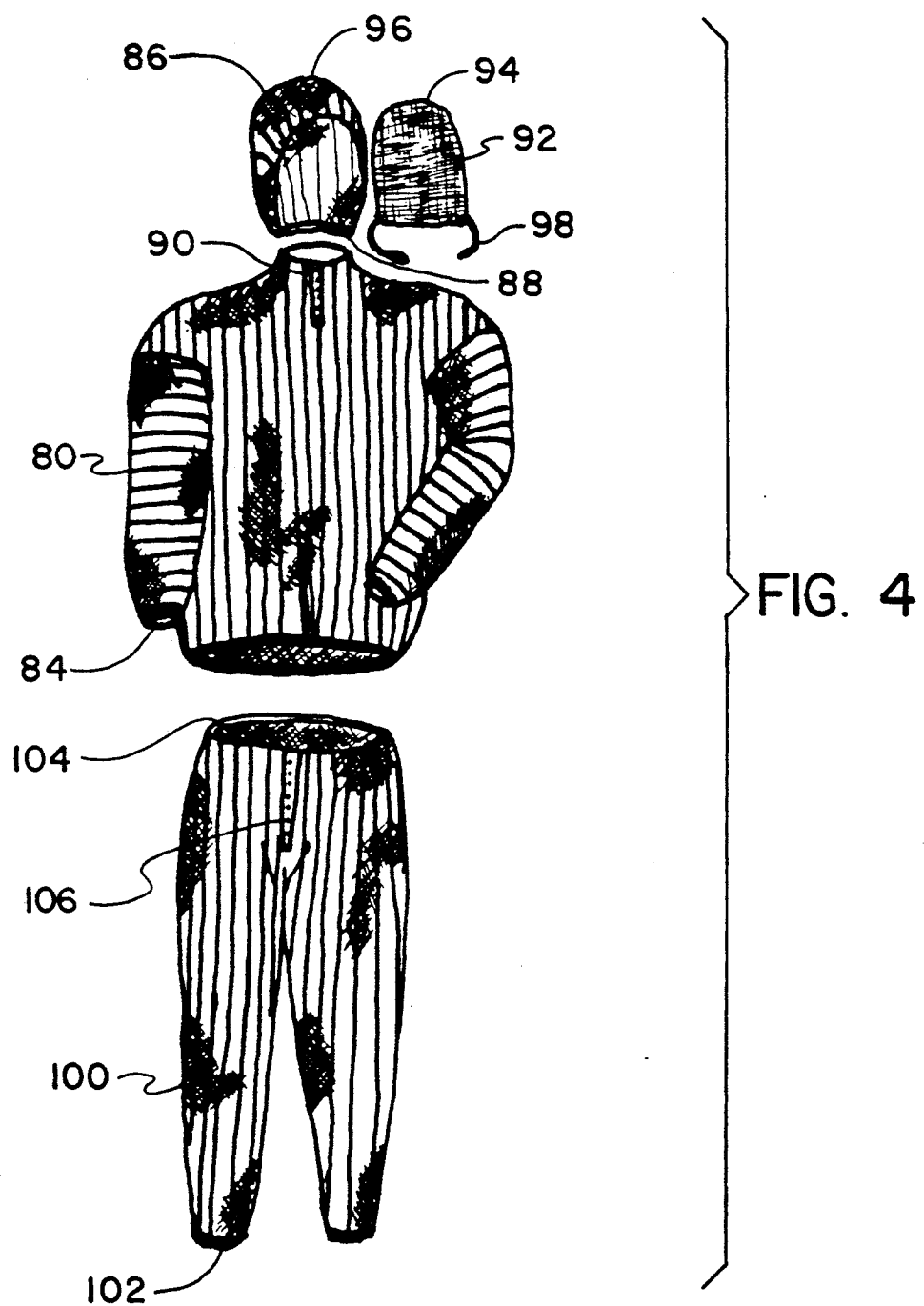
FIG. 4 is a prospective view of a the ribbed fabric formed into a hood, upper body covering, and a lower body covering.

As illustrated in FIG. 3, optimum use of foam strip 52 is obtained by reticulating through caustic bath or blast reticulation to dissolves the cells creating a porous structure with a pore range between 5 and 70 pores per square inch. The process of reticulating further strengthens the foam allowing a narrow or singular through-stitching down the center of the strip.

Again referring to FIG. 2, attaching strip 52 to mesh 50 by a proper thread tension 66 creates a double concave effect of upper surface 54 and lower surface 56. Drawing mesh 50 into concave upper surface 68 creates a series of arches E in mesh 50 between strips 52. Notice is given that strips 52 comprise separate but parallel rows and are not woven together or cross over each other, thus the mesh 50 becomes an integral part of the strip and strip an integral part of the mesh.

Drawing mesh 50 into the strip 52 overcomes the inherent problem that though normal articulation and movement causes strips 52 to come together such as when pulling the sleeves up the forearm to wash one's hands or bending one's elbow. Where the strips would normally be an inch or so apart, the fabric tension of the mesh 50 itself would be enough to bridge the span F between strips 52. Upon moving the strips closer together, the mesh would tend to pucker down and droop toward the wearer's skin shown by distance C allowing an insect's beak or proboscis to to breach distance B. By drawing mesh 50 into the foam through tension stitching 66 creates a series of slight arches E so that when strips 52 are brought together mesh 50 will pucker up in the direction of the arches E away from the wearer's skin 64 further distancing F the mesh 50 from the beak or proboscis of the insect 60. Also, concave shape 72 of stitched strip 52 will serve to lessen surface contact with wearer's skin 64 to single points 74 and 76.

Combining of the mesh and strip allows for creation of any shape or size to be fashion therefrom. For instance, a coat can be made for a dog or a blanket can be made to cover a tomato plant. Typically, the method of creating a garment for use as a protective coating against insects can be shown as follows:

(a) locate a plurality of elongated, rectilinear-shaped, flexible strips of reticulated polyurethane foam on an insect excluding fabric;

(b) position each strip in a spatial relation to each other forming parallel lines of said strip;

(c) stitching each said strip by through-stitching down the center line of each strip forming a unitary fabric construction;

(e) placing a garment pattern on said unitary fabric construction and forming a garment therefrom.

Now referring to FIG. 3, an embodiment of the invention is set forth wherein a typical garment for humans is illustrated. Upper body portion 80 is shaped to a human torso including a resealable neck opening 82 such as a button, zipper, or VELCRO attachment. Sleeves 84 may include cuffs 84 of elastic or the like with the purpose of excluding insects from entering therethrough. Hood 86 can be attached to the upper portion 80 formed in the shape of a head with a preferred method of attachment by use of VELCRO conforming means 90 located on the collar of upper portion 80. In this embodiment, it has been found that a detachable veil 92 with VELCRO border 94 conforming to VELCRO strip 96 of hood 86 is preferred. Tie string or VELCRO fastener 98 can be used to secure the shield to the head. Foam strips are not necessary on the face shield if the edge opening 96 is extended beyond the facial portion. The foam strips may be positioned to run vertical in some areas such as over torso (chest shoulders and back) and horizontal banding around arms. A lower body portion 100 form pants adapted to cover the legs of the wearer with leg cuffs 102 and waist gatherer 104 made from elastic, draw string, VELCRO, or other closure for excluding insects. Pants opening 106 can be provided as in a conventional garment.

It is to be understood that while I have illustrated and described certain examples of practicing my method and apparatus for protection of skin against mosquitoes and other insects, it is not to be limited to the specific examples or components utilized in accomplishing the method herein described and shown. It will be apparent to those skilled in the art that various changes may be made without departing from the scope of the invention and the invention is not to be considered limited to what is shown in the drawings and described in the specification.

That which is claimed is:

1. A textile for use as a protective garment against insects to be worn outdoors, said textile comprising: an insect excluding mesh having an inner and an outer surface face; and, a plurality of elongated, rectangular, flexible strips of reticulated foam material having a length and a width and an overall thickness, said strips disposed in a spatial relation to each other by stitching to said inner surface face of said mesh forming parallel strips thereon, said stitching deforming a center portion of said strip to a second thickness, the second thickness being less than the overall thickness, said inner surface of said mesh is pulled to the second thickness creating an outward curvature of the mesh between each of said strips, whereby said mesh maintains a fixed distance from the skin of a wearer by said overall thickness of said strips when said strips are at a maximum spatial relation, said mesh being directed away from the skin by the deforming center portion of said strips when said strips are at less than maximum spatial relation by the deforming center portion of said strips.

2. The textile according to claim 1 wherein said mesh is made of a synthetic or cotton fabric blend having a small mesh size that prevents passage of mosquitoes and other biting insects therethrough.

3. The fabric according to claim 1 wherein said flexible strips are approximately ¼ inch thick and ⅜ inch wide.

4. The fabric according to claim 3 wherein said reticulated polyurethane foam has 35 pores per square inch.

5. The textile according to claim 1 wherein said strips are disposed in a spatial relation which is further defined as a distance between each parallel strip of about ⅜ inch.

6. A protective garment for use by humans to provide protection against biting insects, said garment comprising: an insect excluding synthetic mesh having an inner and an outer surface face; and, a plurality of elongated, flexible strips of reticulated polyurethane foam having a length and approximately a ⅜ inch width and approximately a ¼ inch overall thickness, said strips disposed in a spatial relation to each other by stitching to said inner surface face of said mesh forming parallel strips thereon, said stitching deforming a center portion of said strip to a second thickness, the second thickness being less than the overall thickness, said inner surface of said mesh is pulled to the second thickness creating an outward curvature of the mesh between each of said strips, whereby said mesh maintains a fixed distance from the skin of a wearer by said overall thickness of said strips when said strips are at a maximum spatial relation, said mesh being directed away from the skin by the deforming center portion of said strips when said strips are at less than maximum spatial relation by the deforming center portion of said strips.

7. The garment according to claim 6 wherein said garment conforms to an upper body portion of a human, said garment having sleeves conforming to the arms of the human with a waist opening, a cuff opening for the wearer's wrists and a neck opening, said garment having a means for sealing the waist, cuff, and neck openings.

8. The garment according to claim 6 wherein said garment is further defined as a garment conforming to a lower body portion of the human further having a waist and leg cuff openings and further having a means for sealing the waist and leg cuff openings.

9. The garment according to claim 6 wherein said garment is further defined as a hood conforming to the head portion of a human with a neck opening and facial openings and further having a means for sealing the neck and facial openings.

10. The garment according to claims 7, 8, or 9 wherein said means for sealing is further defined as a hook and loop fastener, an elastic band gatherer, or a string tie gatherer for releasable sealing thereof.

11. A method of creating a garment for use as a protective coating against insects, said method comprising:

(a) locating a plurality of elongated, rectangular, flexible strips of reticulated polyurethane foam on an insect excluding mesh;

(b) positioning each strip in a spatial relation to adjacent strips forming substantially parallel rows;

(c) stitching each said strip by through-stitching along the center of each strip forming a unitary textile construction;

(e) placing a garment pattern on said unitary textile construction and forming a garment therefrom.

* * * * *